US012234121B2

(12) United States Patent
Witczak

(10) Patent No.: US 12,234,121 B2

(45) Date of Patent: Feb. 25, 2025

(54) REMOTELY MAINTAINING THE CONNECTION STATUS OF A CONNECTION PORT OF A PASSENGER CARRYING SYSTEM

(71) Applicant: OTIS ELEVATOR COMPANY, Farmington, CT (US)

(72) Inventor: Tadeusz Pawel Witczak, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1722 days.

(21) Appl. No.: 16/258,934

(22) Filed: Jan. 28, 2019

(65) Prior Publication Data

US 2020/0239271 A1 Jul. 30, 2020

(51) Int. Cl.
*B66B 1/34* (2006.01)
*B66B 5/00* (2006.01)

(52) U.S. Cl.
CPC .......... *B66B 1/3453* (2013.01); *B66B 5/0087* (2013.01)

(58) Field of Classification Search
None
See application file for complete search history.

(56) References Cited

U.S. PATENT DOCUMENTS 5,064,026 A 11/1991 Nagata et al.
8,028,807 B2 10/2011 Deplazes et al.
8,595,810 B1 * 11/2013 Ben Ayed ........... H04L 63/0815 713/168
2004/0148131 A1 * 7/2004 Azpitarte ................ H04L 67/12 702/184
2009/0309745 A1 * 12/2009 Johnson .............. G06F 11/3058 340/635
2011/0071929 A1 * 3/2011 Morrison .............. G06Q 30/04 705/30
2014/0069745 A1 * 3/2014 Dellarippa ............ B66B 5/0087 187/381

(Continued)

FOREIGN PATENT DOCUMENTS

| | | |
|---|---|---|
| CN | 104355218 A | 2/2015 |
| CN | 204281017 U | 4/2015 |

(Continued)

OTHER PUBLICATIONS

Koehler, J. and Ottiger, D., 2002. An AI-based approach to destination control in elevators. AI magazine, 23(3), pp. 59-59. (Year: 2002).*

(Continued)

*Primary Examiner* — Luu T Pham
*Assistant Examiner* — Edward X Long
(74) *Attorney, Agent, or Firm* — Carlson, Gaskey & Olds, P.C.

(57) ABSTRACT

An illustrative example embodiment of a method of remotely maintaining a connection status of a connection port of a passenger carrying system includes determining that the connection port is not connected to an authorized device, determining whether at least one criterion is satisfied while the connection port is not connected to an authorized device, and providing a notice to an authorized individual when the at least one criterion is satisfied and the connection port is not connected to an authorized device.

20 Claims, 2 Drawing Sheets

(56) References Cited

U.S. PATENT DOCUMENTS

| | | | | |
|---|---|---|---|---|
| 2017/0228391 | A1* | 8/2017 | Savla | G06F 12/0871 |
| 2018/0005197 | A1* | 1/2018 | Kesler | G08G 5/0004 |
| 2018/0211066 | A1 | 7/2018 | Ahokas et al. | |
| 2018/0255189 | A1* | 9/2018 | Granby | H04N 1/00079 |

FOREIGN PATENT DOCUMENTS

| | | | |
|---|---|---|---|
| JP | H11272972 | A | 10/1999 |
| JP | 2016052933 | A | 4/2016 |
| JP | 2018158769 | A | 10/2018 |
| WO | 2012/154170 | A1 | 11/2012 |
| WO | 2017/050785 | A1 | 3/2017 |

OTHER PUBLICATIONS

Srinivasan, S., et al., Mar. 2024. IoT-Enabled Facial Recognition for Smart Hospitality for Contactless Guest Services and Identity Verification. In 2024 11th International Conference on Reliability, Infocom Technologies and Optimization (Year: 2024).*

Extended European Search Report for Application No. EP 19219507.1 dated Jun. 23, 2020.

* cited by examiner

REMOTELY MAINTAINING THE CONNECTION STATUS OF A CONNECTION PORT OF A PASSENGER CARRYING SYSTEM

BACKGROUND

Modern passenger carrying systems, such as elevators and escalators, include sophisticated electronics. For example, many passenger carrying systems include the capability of reporting operational status information to facilitate remotely monitoring conditions and operation of the system. The control electrics also provide information to a technician onsite inspecting or servicing the system.

Some systems include a service tool communication port that is typically connected to a communication gateway to facilitate providing operational status information to a remotely located monitoring center. The same communication port may be used by a mechanic or technician who has an appropriate service tool. One problem that exists is that a mechanic or technician may disconnect the communication port from the gateway device while servicing or inspecting the system and then leave the communication port disconnected. After that individual departs from the site of the passenger carrying system, the disconnected communication port prevents remote monitoring of the system.

SUMMARY

An illustrative example embodiment of a method of remotely maintaining a connection status of a connection port of a passenger carrying system includes determining that the connection port is not connected to an authorized device, determining whether at least one criterion is satisfied while the connection port is not connected to an authorized device, and providing a notice to an authorized individual when the at least one criterion is satisfied and the connection port is not connected to an authorized device.

In an example embodiment having one or more features of the method of the previous paragraph, the connection port is a service tool port and determining the connection status of the connection port comprises determining whether the service tool port is connected to at least one of a service tool or a communication gateway device.

In an example embodiment having one or more features of the method of any of the previous paragraphs, the at least one criterion comprises at least one of the authorized individual being further than a threshold distance from the connection port and an amount of time the connection port has been disconnected from an authorized device exceeds a threshold time.

In an example embodiment having one or more features of the method of any of the previous paragraphs, determining whether the authorized individual is within the threshold distance comprises at least one of determining a location of the authorized individual by determining a position of a communication device associated with the authorized individual, and determining if a communication device associated with the authorized individual is detectable by another communication device near the connection port.

In an example embodiment having one or more features of the method of any of the previous paragraphs, the communication device comprises a mobile station and providing the notice comprises sending a message to the mobile station indicating that the connection port is not connected to an authorized device.

In an example embodiment having one or more features of the method of any of the previous paragraphs, the mobile station responds to the message by generating an alert that is at least one of audible, tactile and visual.

An example embodiment having one or more features of the method of any of the previous paragraphs includes determining whether the authorized individual has provided an acceptable response to the notice, determining whether a connection restoration time has passed since providing the notice to the authorized individual, and providing a second notice to at least the authorized individual indicating that the connection port is not connected when the connection port remains not connected, the authorized individual has not responded to the notice, and the restoration time has passed.

An example embodiment having one or more features of the method of any of the previous paragraphs includes determining the connection restoration time based on a distance between the connection port and the authorized individual when the notice was provided, and wherein the acceptable response comprises at least one of an indication of a reason that the connection port remains not connected or an indication that the authorized individual will connect the connection port to the at least one authorized device at a later time.

An example embodiment having one or more features of the method of any of the previous paragraphs includes determining a service time between an arrival time when the authorized individual arrives at the location of the connection port and a departure time when the authorized individual departs from the location of the connection port, and determining an amount of time that the connection port is connected to a service tool within the determined service time.

An example embodiment having one or more features of the method of any of the previous paragraphs includes determining whether the authorized individual connected and disconnected one or more devices and the connection port during the determined service time.

An illustrative example monitoring device includes a processor and memory associated with the processor and is configured to determine whether a connection port of a passenger carrying system is connected to an authorized device, determine whether at least one criterion is satisfied while the connection port is not connected to an authorized device, and cause a notice to be provided to the authorized individual when the connection port is not connected to an authorized device and the at least one criterion is satisfied.

In an example embodiment having one or more features of the monitoring device of any of the previous paragraphs, the connection port is a service tool port and the detector detects whether the connection port is connected to an authorized device by detecting whether the service tool port is connected to at least one of a service tool or a communication gateway device.

In an example embodiment having one or more features of the monitoring device of any of the previous paragraphs, the at least one criterion comprises at least one of the authorized individual being further than a threshold distance from the connection port, and an amount of time the connection port has been disconnected from an authorized device exceeds a threshold time.

In an example embodiment having one or more features of the monitoring device of any of the previous paragraphs, the processor determines whether the authorized individual is within the threshold distance comprises at least one of determining a location of the authorized individual by determining a position of a communication device associated with the authorized individual, and determining if a communication device associated with the authorized individual is detectable by another communication device near the connection port.

In an example embodiment having one or more features of the monitoring device of any of the previous paragraphs, the communication device comprises a mobile station and the controller causes a message to be sent to the mobile station indicating that the connection port is not connected.

In an example embodiment having one or more features of the monitoring device of any of the previous paragraphs, the mobile station responds to the message by generating an alert that is at least one of audible, tactile and visual.

In an example embodiment having one or more features of the monitoring device of any of the previous paragraphs, the processor is configured to determine whether the authorized individual has provided an acceptable response to the notice, determine whether a connection restoration time has passed since providing the notice to the authorized individual, and cause a second notice to be provided to at least the authorized individual indicating that the connection port is not connected when the connection port remains not connected, the authorized individual has not provided the acceptable response to the notice, and the restoration time has passed.

In an example embodiment having one or more features of the monitoring device of any of the previous paragraphs, the processor is configured to determine the connection restoration time based on a distance between the connection port and the authorized individual when the notice was provided, and the acceptable response comprises at least one of an indication of a reason that the connection port remains not connected or an indication that the authorized individual will connect the connection port to the at least one authorized device at a later time.

In an example embodiment having one or more features of the monitoring device of any of the previous paragraphs, the processor is configured to determine a service time between an arrival time when the authorized individual arrives at the location of the connection port and a departure time when the authorized individual departs from the location of the connection port, and determine an amount of time that the connection port is connected to a service tool within the determined service time.

In an example embodiment having one or more features of the monitoring device of any of the previous paragraphs, the processor is configured to determine whether the authorized individual connected and disconnected one or more devices and the connection port during the determined service time.

The various features and advantages of at least one disclosed example embodiment will become apparent to those skilled in the art from the following detailed description. The drawings that accompany the detailed description can be briefly described as follows.

DETAILED DESCRIPTION

Figure 1:
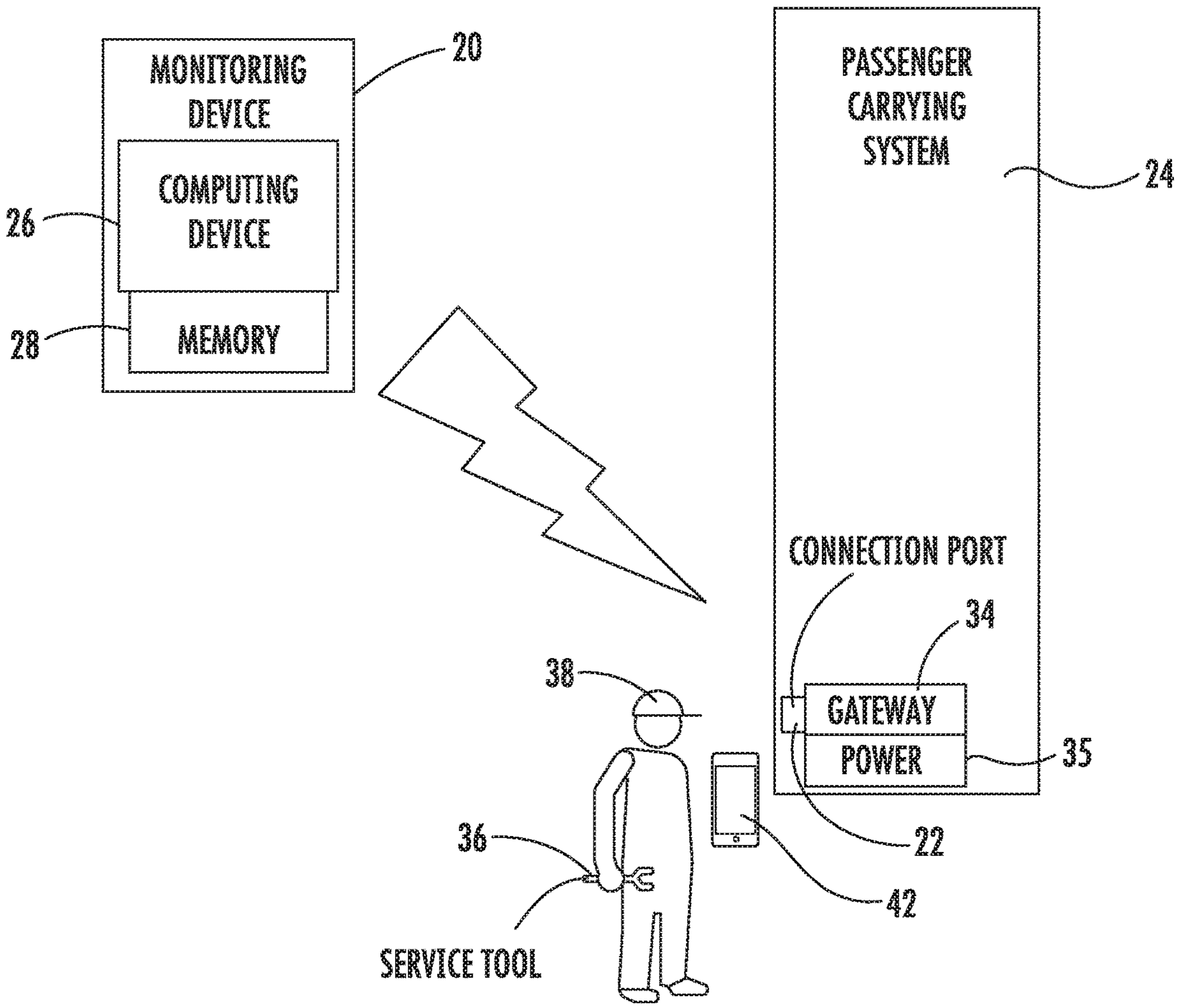
FIG. 1 schematically illustrates a system for remotely monitoring selected aspects of a passenger carrying system.

FIG. 1 schematically shows a monitoring device 20 that remotely monitors a status of a connection port 22 of a passenger carrying system 24. In some examples, the passenger carrying system is an elevator system. In other instances, the passenger carrying system 24 is an escalator or moving walkway.

The monitoring device 20 includes at least one computing device 26 and memory 28. The computing device 26 includes at least one processor and may be realized utilizing cloud computing resources, for example. The memory 28 in this example includes information regarding a plurality of passenger carrying systems 24 and their associated connection ports 22, which are all located remotely from the monitoring device 20. In some embodiments, information regarding different systems 24 is available to the computing device 26 from an outside or remote database. The memory 28, in some embodiments, also includes processor-executable instructions that cause the computing device 26 to perform the functions described below for maintaining the status of connection ports 22 of a variety of passenger carrying systems 24.

Figure 2:
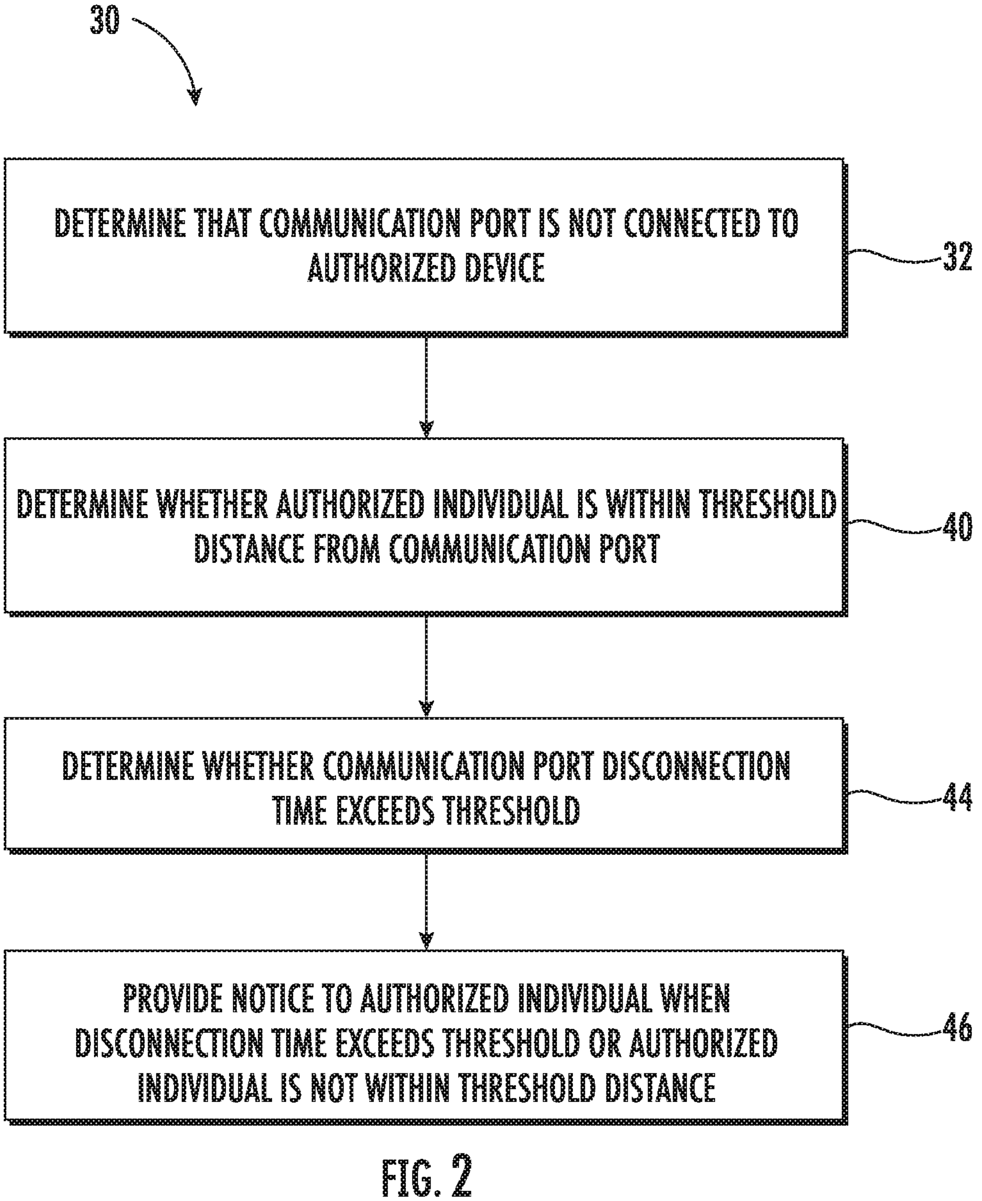
FIG. 2 is a flowchart diagram illustrating an example method of remotely maintaining the connection status of a connection port of a passenger carrying system.

FIG. 2 is a flowchart diagram 30 that summarizes an example approach for remotely maintaining the connection status of the connection port 22. With this approach, an individual can be notified that the connection port 22 may have been incorrectly or inadvertently left disconnected because at least one criterion is satisfied.

At 32, the monitoring device 20 monitors the connection status of the connection port 22 and determines that the connection port 22 is not currently connected to an authorized device. In this embodiment, the connection port 22 is capable of providing a status indication to the monitoring device 20 utilizing known line-based or wireless communication techniques. The status indication from the connection port 22 indicates whether the port is connected to an authorized device, such as a communication gateway 34 of the passenger carrying system 24, or to a power source 35. In some embodiments where the connection port 22 requires external power to generate a status message, the absence of a status message from the connection port 22 at an expected interval serves as an indication that the connection port 22 is not properly connected to the power source 35.

The connection port 22, in this example, is also configured to be selectively connected with a service tool 36 utilized by an authorized individual 38, such as a mechanic, technician, or inspector. When the authorized individual 38 desires to perform service on the passenger carrying system 24, for example, the service tool 36 may be connected to the connection port 22 to provide the individual 38 with information regarding the passenger carrying system 24. The service tool 36 may also be used to input data, system configuration information, or updates to software or firmware, for example, into appropriate portions of the passenger carrying system 24.

In order to connect the service tool 36 with the connection port 22, the individual 38 must disconnect that connection port 22 from other devices, such as the communication gateway 34.

At 40 in FIG. 2, the monitoring device 20 determines whether the authorized individual 38 is within a threshold distance of the communication port 22. In some example embodiments, the threshold distance is within a predetermined range relative to the site of the system 24, which includes the location of the connection port 22. The way in which the monitoring device 20 makes this determination may vary depending on the embodiment.

For example, the monitoring device 20 may determine a current location of the individual 38. This determination may be based on receiving location information provided from another device or system. In the example of FIG. 1, the individual 38 has a mobile station 42 that facilitates obtaining the location information. The mobile station 42 may be a smartphone or another type of device capable of remote communications over the Internet or another network. Some mobile stations include a global positioning system (GPS) receiver that provides location information, such as a longitude and latitude of the current location of the mobile station 42, which is presumed to be the location of the individual 38. Other possibilities include location identification based on cellular station signal triangulation location techniques.

In some embodiments, the monitoring device 20 does not require current location information but, instead, uses a lack or absence of a short-range communication link (e.g., Wi-Fi or Bluetooth) with the mobile station 42 as an indication that the individual 38 is not within the desired range of the connection port 22. If the individual 38 is at the site of the system 24 and there is a local wireless communication network or beacon signaling device at that site, the mobile station 42 should establish a connection or be detectable while the individual 38 is at the site. When such a connection is missing or the mobile station 42 is otherwise not detectable, the monitoring device 20 determines that the individual 38 is not within a threshold distance of the communication port 22.

When the monitoring device 20 determines that the connection port 22 is not connected to an authorized device, and an authorized individual is at the location or site of the passenger carrying system 24, the monitoring device 20 assumes that the individual 38 has the connection port 22 disconnected from other devices for a legitimate reason.

The illustrated example embodiment also includes determining how long the connection port 22 has been disconnected. At 44, the monitoring device 20 determines whether the disconnection time exceeds a preselected threshold time.

In the illustrated example embodiment, the threshold distance and the threshold time are criteria used by the monitoring device 20 to determine whether the connection status of the connection port 22 requires attention or correction. At 46, the monitoring device 20 causes a notice to be provided to the individual 38 that the connection port 22 is not connected to at least one authorized device if at least one of the criteria is satisfied. According to the example of FIG. 2, the notice is provided to the authorized individual 38 when the connection port 22 is not connected to at least one authorized device for a time that exceeds the threshold time or the authorized individual 38 is beyond the threshold distance from the connection port 22. Providing such notice assists the individual 38 in recognizing the need to connect the connection port 22 to the gateway 34, the power source 35, or both so that ongoing, remote monitoring of the passenger carrying system 24 may continue. Without a proper connection between the connection port 22 and the gateway 34, such remote monitoring is not possible in the illustrated example.

The mobile station 42 provides an alert in response to the notice, which comprises a message from the monitoring device 20, regarding the disconnected status of the connection port 22. The alert may be an audible, tactile or visual indication on the mobile station 42. An additional alert may be provided to other personnel, which may be at the location of the monitoring device 20 for example.

In some embodiments, the individual 38 has the option of responding to the notice provided on the mobile station 42. Acceptable responses include an indication that the connection port 22 was left disconnected for a legitimate reason. For example, the associated passenger carrying system 24 may be left powered down for additional maintenance reasons. Another example acceptable response is that the individual 38 will reestablish the appropriate connection for the connection port 22 at a later time.

The monitoring device 20 takes into account whether an appropriate response to the notice has been received. If no response has been provided and a connection restoration time has passed since the notice was provided regarding the disconnected connection port 22, the monitoring device 20 provides a second notice to at least the same authorized individual 38 and possibly to other authorized individuals within a reasonable distance from the passenger carrying system 24. In some examples, the processor of the computing device 26 determines a connection restoration time based on the distance between the connection port 22 and the authorized individual when the notice was provided. For example, if the individual has traveled a significant distance from the site of the passenger carrying system 24, it will take longer for that individual to return to restore an appropriate connection for the connection port 22. The monitoring device 20, in this example, takes such information into account when determining whether an appropriate amount of time has passed to warrant providing a second notice.

Another feature of the illustrated example embodiment is that the monitoring device 20 determines a service time between an arrival time when the individual 38 arrives at the location of the passenger carrying system 24 and a departure time when that individual 38 leaves that location. The monitoring device 20 also determines an amount of time that the connection port 22 is connected to the service tool 36 within that service time. This allows the monitoring device 20 to provide reporting information regarding the amount of time the individual 38 spends at the worksite and the amount of time that same individual utilizes a service tool 36 to perform one or more procedures during that service time.

The monitoring device 20 is also capable of determining a series of connections between the connection port 22 and one or more devices while the individual 38 is at that site. For example, when a specific sequence or timing of connections is required to properly perform an inspection or maintenance procedure, the monitoring device 20 may gather information regarding whether the individual 38 is properly performing that procedure.

Embodiments of monitoring devices like that described above enhance productivity of service individuals by providing an alert or notice that a connection port has to be reconnected before that individual travels very far from the site of that connection port. Additionally, more reliable or continuous connection between the connection port 22 and the gateway 34 will be maintained yielding an increased amount of information available for ongoing monitoring of the passenger carrying system 24.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method remotely maintaining a connection status of a connection port of a passenger carrying system, the method comprising:

providing a plurality of authorized devices that include at least a communication gateway of the passenger carrying system, a service tool, and a power source, and wherein the passenger carrying system comprises an elevator, escalator, or moving walkway;

monitoring a connection status of the connection port with a monitoring device that is remotely located relative to the connection port associated with the passenger carrying system;

disconnecting the connection port from the communication gateway to connect the service tool with the connection port to perform a service operation;

determining that the connection port is not connected to an authorized device of the plurality of authorized devices via the monitoring device;

determining whether at least one criterion is satisfied while the connection port is not connected to the authorized device, wherein the at least one criterion comprises at least an authorized individual being further than a threshold distance from the connection port, and an amount of time the connection port has been disconnected from an authorized device exceeds a threshold time;

providing a notice to a communication device associated with the authorized individual in response to a determination that the at least one criterion is satisfied and the connection port is not connected to an authorized device, wherein providing the notice comprises using the monitoring device to generate a message that is communicated to the communication device; and in response to receipt of the notice, connecting the connection port to one or both of the communication gateway and the power source to provide ongoing, remote monitoring of the passenger carrying system.

2. The method of claim 1, wherein:

the connection port is a service tool port; and determining the connection status of the connection port comprises determining whether the service tool port is connected to at least one of a service tool or a communication gateway device.

3. The method of claim 1, wherein determining whether the authorized individual is within the threshold distance comprises at least one of determining a location of the authorized individual by determining a position of the communication device associated with the authorized individual, and determining if the communication device associated with the authorized individual is detectable by another communication device near the connection port.

4. The method of claim 3, wherein the communication device associated with the authorized individual comprises a mobile station; and providing the notice comprises sending the message to the mobile station indicating that the connection port is not connected to an authorized device.

5. The method of claim 4, wherein the mobile station responds to the message by generating an alert that is at least one of audible, tactile and visual.

6. The method of claim 1, comprising determining whether the authorized individual has provided an acceptable response to the notice;

determining whether a connection restoration time has passed since providing the notice to the authorized individual; and providing a second notice to at least the authorized individual indicating that the connection port is not connected when the connection port remains not connected, the authorized individual has not responded to the notice, and the connection restoration time has passed.

7. The method of claim 6, comprising determining the connection restoration time based on a distance between the connection port and the authorized individual when the notice was provided, and wherein the acceptable response comprises at least one of an indication of a reason that the connection port remains not connected or an indication that the authorized individual will connect the connection port to at least one authorized device at a later time.

8. The method of claim 1, comprising determining a service time between an arrival time when the authorized individual arrives at a location of the connection port and a departure time when the authorized individual departs from the location of the connection port; and determining an amount of time that the connection port is connected to a service tool within a determined service time.

9. The method of claim 8, comprising determining whether the authorized individual connected and disconnected one or more devices and the connection port during the determined service time.

10. A monitoring device, comprising:

a plurality of authorized devices that include at least a communication gateway of a passenger carrying system, a service tool, and a power source, and wherein the passenger carrying system comprises an elevator, escalator, or moving walkway;

a connection port for the passenger carrying system that is connectable to the plurality of authorized devices;

the connection port being disconnected from the communication gateway to connect the service tool with the connection port to perform a service operation;

a processor and memory associated with the processor, the monitoring device being configured to:

determine via the monitoring device whether the connection port of the passenger carrying system is connected to an authorized device of the plurality of authorized devices, wherein the monitoring device is remotely located relative to the passenger carrying system associated with the connection port; determine whether at least one criterion is satisfied while the connection port is not connected to an authorized device, wherein the at least one criterion comprises at least an authorized individual being further than a threshold distance from the connection port, and an amount of time the connection port has been disconnected from an authorized device exceeds a threshold time;

cause a notice to be provided to a communication device associated with an authorized individual in response to a determination that the connection port is not connected to an authorized device and the at least one criterion is satisfied, wherein providing the notice comprises using the monitoring device to generate a message that is communicated to the communication device; and in response to receipt of the notice, connecting the connection port to one or both of the communication gateway and the power source to provide ongoing, remote monitoring of the passenger carrying system.

11. The monitoring device of claim 10, wherein;

the connection port is a service tool port; and a detector detects whether the connection port is connected to an authorized device by detecting whether the service tool port is connected to at least one of a service tool or a communication gateway device.

12. The monitoring device of claim 10, wherein the processor determines whether the authorized individual is within the threshold distance comprises at least one of determining a location of the authorized individual by determining a position of the communication device associated with the authorized individual, and determining if the communication device associated with the authorized individual is detectable by another communication device near the connection port.

13. The monitoring device of claim 12, wherein the communication device associated with the authorized individual comprises a mobile station; and the processor causes a message to be sent to the mobile station indicating that the connection port is not connected.

14. The monitoring device of claim 13, wherein the mobile station responds to the message by generating an alert that is at least one of audible, tactile and visual.

15. The monitoring device of claim 10, wherein the processor is configured to determine whether the authorized individual has provided an acceptable response to the notice;

determine whether a connection restoration time has passed since providing the notice to the authorized individual; and cause a second notice to be provided to at least the authorized individual indicating that the connection port is not connected when the connection port remains not connected, the authorized individual has not provided the acceptable response to the notice, and the connection restoration time has passed.

16. The monitoring device of claim 15, wherein the processor is configured to determine the connection restoration time based on a distance between the connection port and the authorized individual when the notice was provided, and wherein the acceptable response comprises at least one of an indication of a reason that the connection port remains not connected or an indication that the authorized individual will connect the connection port to at least one authorized device at a later time.

17. The monitoring device of claim 10, wherein the processor is configured to determine a service time between an arrival time when the authorized individual arrives at a location of the connection port and a departure time when the authorized individual departs from the location of the connection port; and determine an amount of time that the connection port is connected to a service tool within a determined service time.

18. The monitoring device of claim 17, wherein the processor is configured to determine whether the authorized individual connected and disconnected one or more devices and the connection port during the determined service time.

19. The monitoring device of claim 10, wherein the connection port is at the passenger carrying system, and wherein the monitoring device includes at least one computing device and memory that are remotely located from the connection port and the passenger carrying system.

20. The method of claim 1, wherein the connection port is at the passenger carrying system, and wherein the monitoring device includes at least one computing device and memory that are remotely located from the connection port and the passenger carrying system.

* * * * *